UNITED STATES PATENT OFFICE.

JOHN CONSTANTINE, OF CEDAR RAPIDS, IOWA.

FOOD COMPOSITION.

1,194,276. Specification of Letters Patent. Patented Aug. 8, 1916.

No Drawing. Application filed January 29, 1916. Serial No. 75,171.

*To all whom it may concern:*

Be it known that I, JOHN CONSTANTINE, a citizen of the United States, residing at Cedar Rapids, in the county of Linn and State of Iowa, have invented certain new and useful Improvements in Food Compositions, of which the following is a specification.

This invention relates to a food composition particularly compounded for feeding animals and the like.

One object of the present invention resides in providing a food composition which is agreeable to taste and possesses beneficial remedial properties which, after continued use of the food by animals, will result in a general improvement in health.

Specifically speaking, the invention consists of a food compound comprising olive oil, olives, bran, nut kernels, such as pecans, almonds, walnuts, and the like, olive kernels, peaches and kernels, cherries and kernels, figs, and prunes and kernels. The foregoing ingredients are reduced to a pulpy mass and thoroughly commingled.

In compounding the remedy, the olives, peaches, cherries, figs, and prunes are first deprived of their pits, stones, or kernels, and the fleshy part is reduced to a thoroughly commingled pulpy mass. Likewise the pits, stones or kernels of the above-mentioned fruits together with nut kernels such as almonds, English walnuts, pecans and the like are pulverized. The pulpy mass and the pulverized mass are then mixed and thoroughly agitated until completed interdistribution of the two is effected. During the agitating, the bran is added and thoroughly mixed. After the above mixture has been completed, olive oil is stirred in, and if desired, the preservative effect of the olive oil may be augmented by some other suitable material.

I have found that desirable proportion in which to compound the ingredients above mentioned are as follows: Olive oil 2 oz.; olives, leaves and kernels 4 oz.; bran 2 oz.; peaches and kernels 2 oz.; cherries and kernels 2 oz.; prunes and kernels 2 oz.; figs 2 oz.; and nut kernels 2 oz.

It is to be noted that the proportions by weight of the peaches and kernels, cherries and kernels, and prunes and kernels are regulated by the weights of the various fruits containing the kernels or pits, whereas the amount of olive kernels or pits added is a specific 2 oz. to 4 oz. of olive pulp.

The mixture, when completed will be found to be a pulpy mass capable of being formed into cakes and dried or hardened if desired. The composition as thus formed is possessed of an agreeable taste appealing particularly to animals, and the constituents thereof are known to have certain beneficial results upon the system in a laxative manner.

While, in the foregoing, I have described specific proportions and ingredients, it is, nevertheless, to be understood that in lieu of the proportions stated and the manner of compounding the ingredients, certain modifications may be resorted to in practising the invention without departing from the scope of the same as defined in the appended claims.

I claim:

1. The hereindescribed method of preparing a food composition which consists in reducing the fleshy constituents of a plurality of fruits to a pulpy commingled mass, then comminuting the pits of said fruits and adding the same to said pulpy mass to form an admixture, and finally adding an oleaginous preservative.

2. The hereindescribed method of preparing a food composition which consists in reducing the fleshy constituents of a plurality of fruits to a pulpy commingled mass, then comminuting the pits of said fruits and adding the same to said pulpy mass to form an admixture, adding an oleaginous preservative, and finally agglomerating said mass into cakes.

3. The hereindescribed method of preparing a food composition which consists in reducing the fleshy constituents of a plurality of fruits to a pulpy commingled mass, then comminuting the pits of said fruits and adding the same to the pulpy mass to form an admixture, blending bran with the resultant mass, and finally adding an oleaginous preservative.

4. The hereindescribed method of preparing a food composition which consists in reducing the fleshy constituents of a plurality of fruits to a pulpy commingled mass, then comminuting the pits of said fruits and adding the same to said pulpy mass, blending bran with the resultant mass, adding an oleaginous preservative, and finally agglomerating the mass into cakes.

5. The hereindescribed method of preparing a food composition which consists in reducing to a pulpy mass the fleshy constituents of a plurality of fruits having laxative properties, thoroughly agitating the pulpy mass and adding thereto the comminuted pits of said fruits, and finally adding an oleaginous preservative.

6. The hereindescribed method of preparing a food composition which consists in reducing to a pulpy mass the fleshy constituents of a plurality of fruits having laxative properties, thoroughly agitating the pulpy mass and adding thereto the comminuted pits of the said fruits, adding bran to the resultant mass, adding an oleaginous preservative, and finally agglomerating the resultant mass and forming the same into cakes.

In testimony whereof I affix my signature in presence of two witnesses.

JOHN CONSTANTINE.

Witnesses:
   SOTERIOS NICHOLSON,
   FLORA S. HARPER.